N. JACOBS.
Grain Mill.
No. 145.
Patented March 11, 1837.
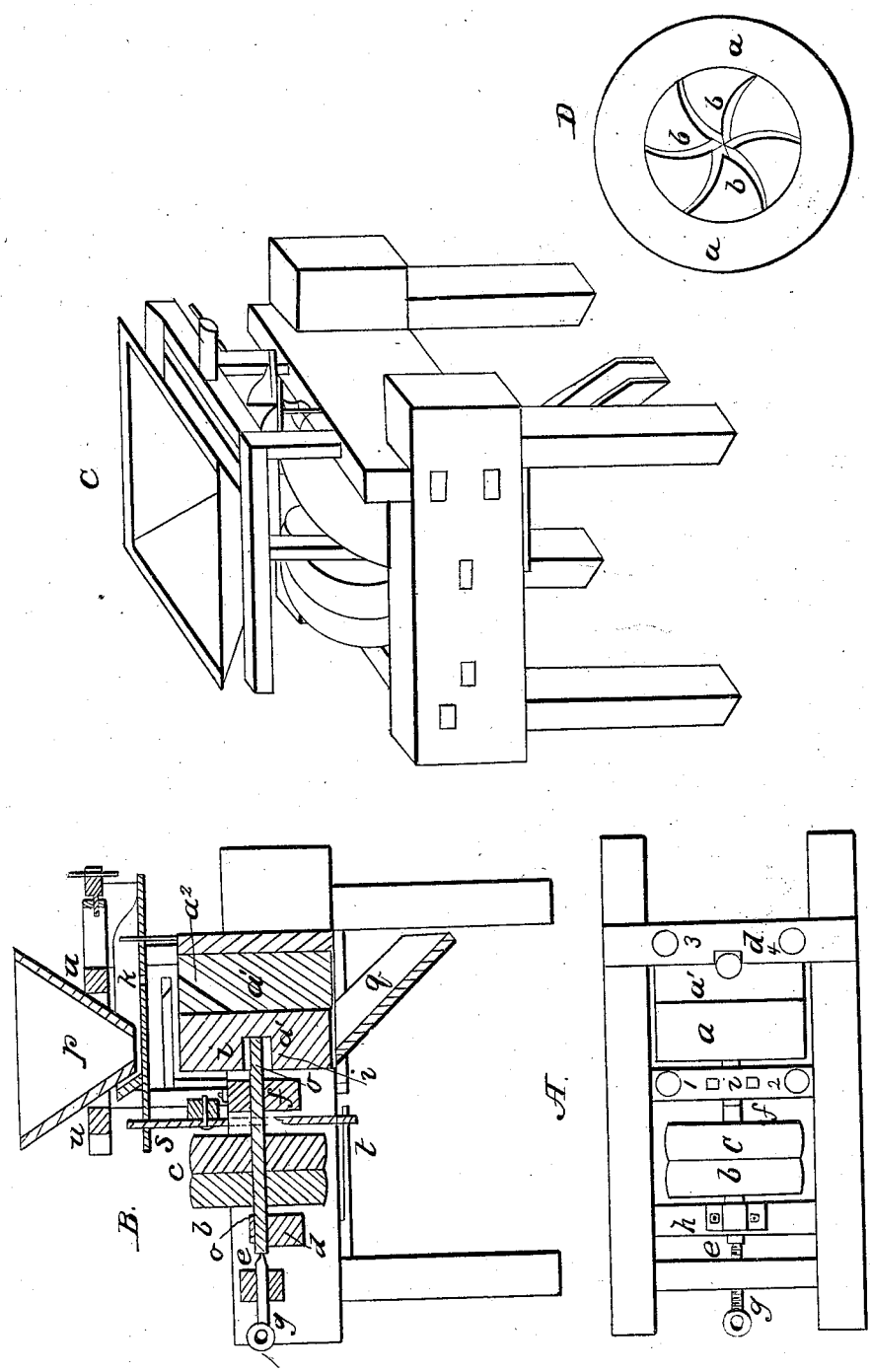

UNITED STATES PATENT OFFICE.

NATHAN JACOBS, OF NEWARK, OHIO.

IMPROVEMENT IN THE MODE OF DRESSING THE STONES OF PORTABLE AND OTHER MILLS.

Specification forming part of Letters Patent No. 145, dated March 11, 1837.

*To all whom it may concern:*

Be it known that I, NATHAN JACOBS, of Newark, in the county of Licking and State of Ohio, have invented an Improved Portable Mill for Grinding Grain; and I do hereby declare that the following is a full and exact description thereof.

The general construction of the mill which I use is not claimed by me as of my invention; but I do claim so far to have improved the same as to have rendered a machine which after long trial had been abandoned as worthless one of great value and utility, and that principally from the manner in which I dress the faces of the stones used by me, thereby causing such as are from eight to fourteen inches in diameter only to produce flour and meal of excellent quality and in large quantity in proportion to the power employed.

The form which I usually give to my mill is represented in the three Figures A, B, and C in the accompanying drawings, A being a top view, B a vertical section, and C a perspective view, of the whole machine. The stones are placed vertically.

In Fig. A, $a$ is the runner, and $a'$ the bed or stationary stone, which latter is in part let into and is firmly fixed in the frame. From its upper side a hole $d$, about two inches in diameter, is drilled obliquely, so as to come out a little above the center of its face for the purpose of feeding in the grain.

$b$ and $c$ are a fast and loose pulley on the spindle $e f$, there being a regulating-screw $g$ and bearings at $h$ and $i$.

1 2 3 4 are holes to receive the posts which support the hopper.

In Fig. B, $a$ $a'$ are the stones; $a^2$, the oblique hole; $b c$, the pulleys; $g e$, the regulating-screw of the spindle $o o$, resting upon bearings $d f$.

At $i i$ in the runner an iron box is inserted, which receives the spindle $o o$, which latter is one and one-fourth inch square and twenty inches long.

$p$ is the hopper supported upon its frame $u u$.

$k$ is the shoe, having a feed-hole in it directly above the hole $a^2$ in the stone. The shaking of the shoe is effected by the staff $s$, which passes down by the square part of the spindle-shaft, the spring $t$ at its lower end keeping it up to the spindle.

$q$ is the spout.

Fig. C shows the mill in perspective, and does not require any further explanation.

Fig. D is a representation of the face of the stone, which in this part are alike, with the exception of the feed-hole in the bed-stone. The portion $a a$, occupying two-fifths of the diameter of the stone, (more or less,) is made perfectly flat and unfurrowed. From this to the center there is a slight concavity.

$b b b$ are furrows, of which there may be six or any other convenient number. These are to be sufficiently deep at the center to admit a grain of corn readily, gradually passing off to nothing when they arrive at the flat and smooth part $a a$.

What I specially claim is—

The particular manner of dressing the stones, as herein described, with a large portion of the face toward the periphery perfectly flat, while the part interior to this is slightly concave and furrowed in the manner set forth, and this I claim whether the stones so dressed are used in a mill the other parts of which are made in the manner described or in any other admitting the employment of such stones.

NATHAN JACOBS.

Witnesses:
THOS. P. JONES,
ARTHUR L. MCINTIRE.